Figure 5:
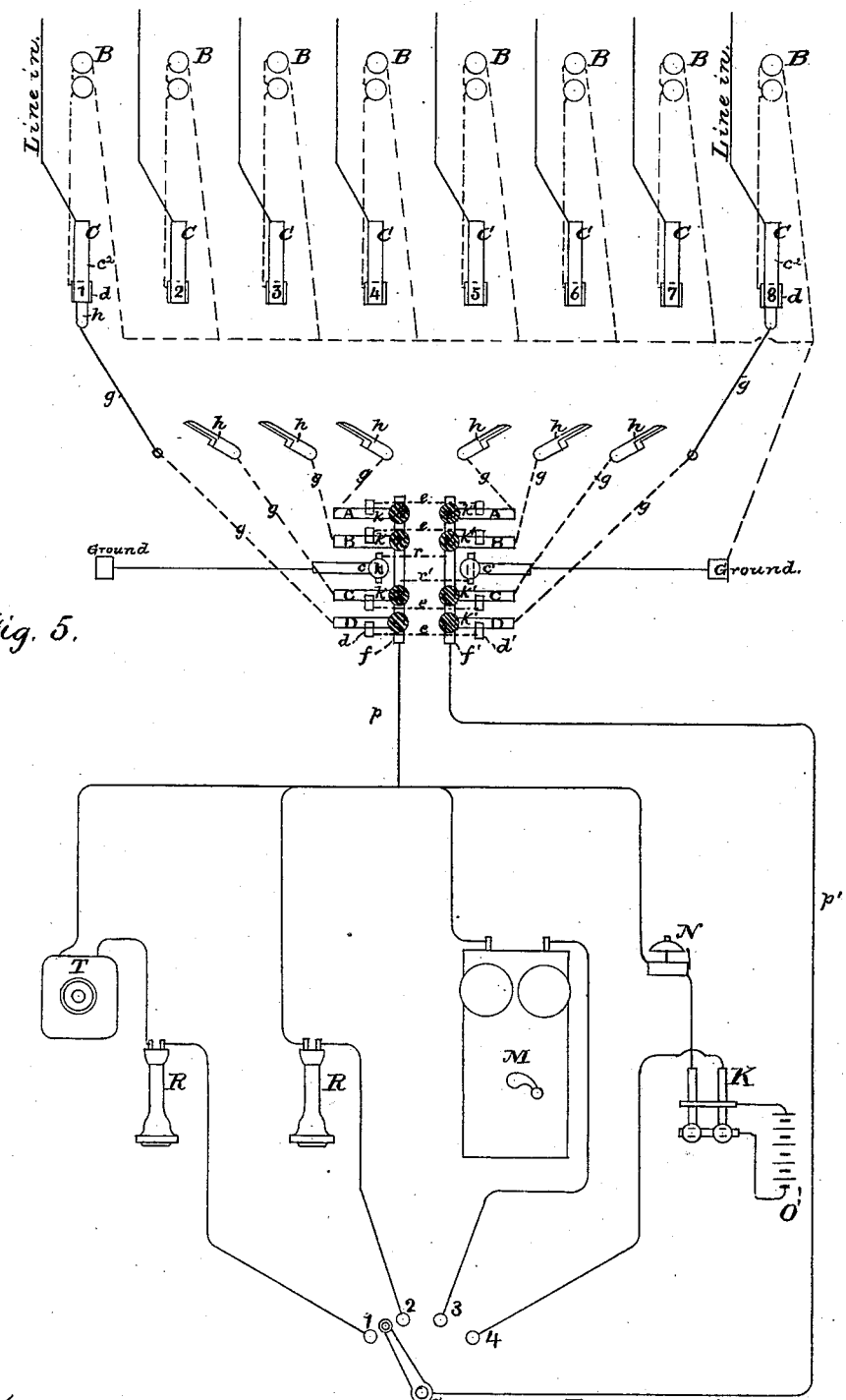

(No Model.) 2 Sheets—Sheet 1.
T. A. WATSON.
TELEPHONE EXCHANGE SYSTEM.
No. 256,258. Patented Apr. 11, 1882.
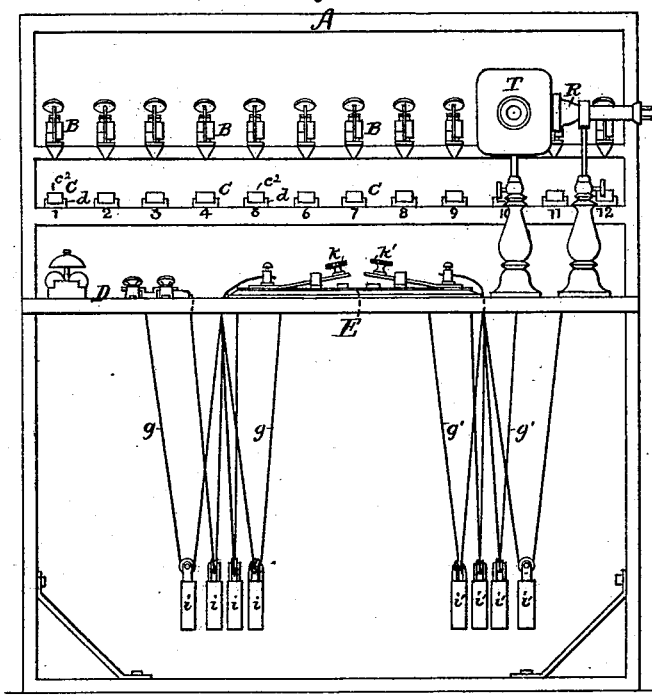
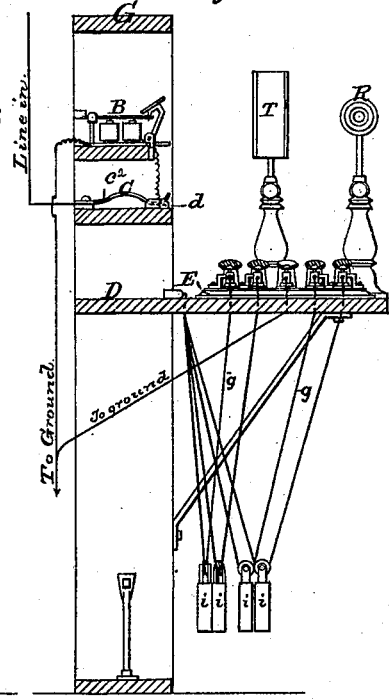
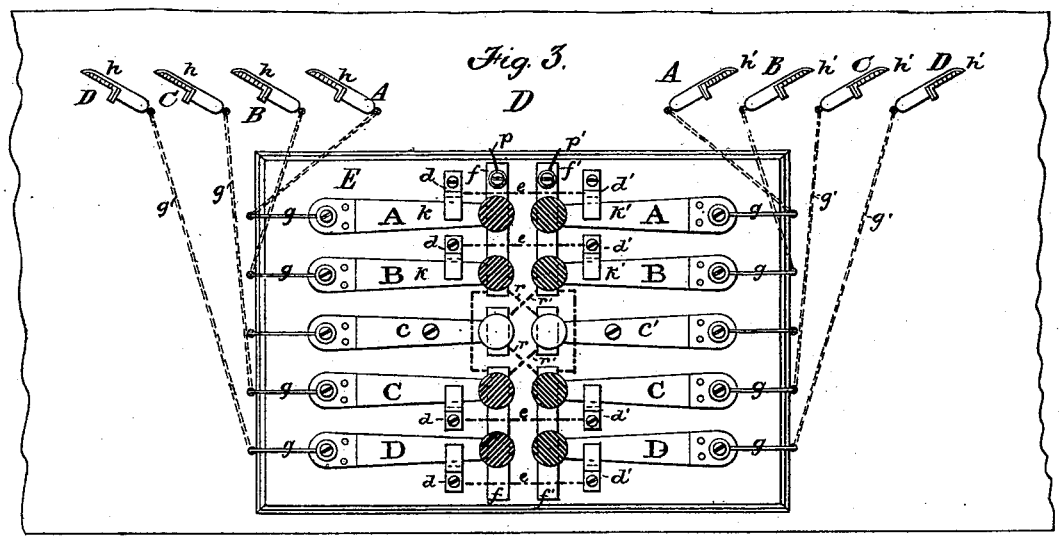
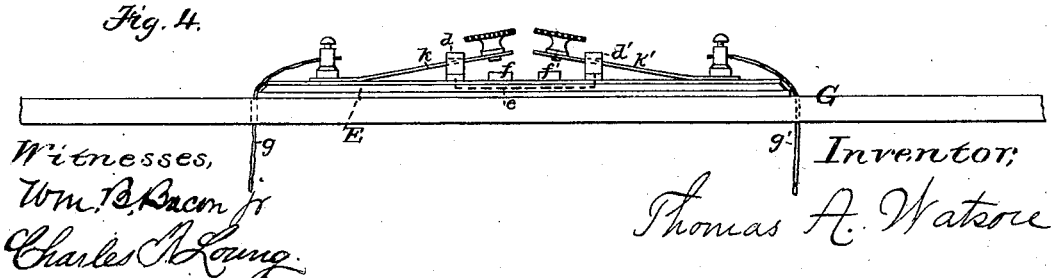
Witnesses,
Wm. B. Bacon Jr.
Charles A. Loring.
Inventor;
Thomas A. Watson (No Model.)

2 Sheets—Sheet 2.

T. A. WATSON.
TELEPHONE EXCHANGE SYSTEM.

No. 256,258.      Patented Apr. 11, 1882.

Witnesses,
Inventor
Thomas A. Watson

UNITED STATES PATENT OFFICE.

THOMAS A. WATSON, OF EVERETT, ASSIGNOR TO THE AMERICAN BELL TELEPHONE COMPANY, OF BOSTON, MASSACHUSETTS.

TELEPHONE-EXCHANGE SYSTEM.

SPECIFICATION forming part of Letters Patent No. 256,258, dated April 11, 1882.

Application filed April 20, 1880. (No model.)

*To all whom it may concern:*

Be it known that I, THOMAS A. WATSON, a citizen of the United States, residing at Everett, in the county of Middlesex and State of Massachusetts, have invented certain new and useful Improvements in Telephone-Exchange Apparatus; and I do hereby declare that the following is a full, clear, and exact description of the invention, which will enable others skilled in the art to which it appertains to make and use the same.

This invention relates to certain new and useful apparatus and appliances employed in telephonic exchange systems, and has for its object to simplify the mode of transacting the business in such systems, and to perform the business in a comprehensive and economical manner.

By my improved devices and arrangements the work of a central office can be greatly facilitated, as the number of movements necessary to answer a call or make a connection is reduced to a minimum.

My invention consists principally in a key-board, by means of which the necessary operations to receive, answer, and make connections and disconnections are made with certainty in the shortest possible time.

My invention also consists in the combination of said key-board with spring-jacks or their equivalents, call-bells or indicators, and flexible cords and wedges, arranged with reference to a battery and call-bell, and a receiving and transmitting telephone, so as to perform the operations of receiving, calling, and connecting and disconnecting; or, in other words, to perform all the business of a telephonic central office.

The essential means employed to make suitable connections between the different apparatus to effect any desired operation are keys, so arranged upon a key-board and connected that when depressed singly or in combination said connections will be made. By depressing a key or keys after the key-board has been suitably connected to the subscribers' lines the operator can be placed into receiving and transmitting communication with any one subscriber, or with any two at the same time; and when said connections are made as just mentioned the subscribers can talk with each other through the said key-board and apparatus. This key-board and apparatus can be used with lines connected with any form of switch-board.

In order more fully to explain the invention and the manner of carrying the same into effect, I will now proceed to describe it in connection with the accompanying drawings, forming a part of this specification.

Figure 1 represents a front view of an arrangement of my invention as used in a central office; Fig. 2, a section of the same; Fig. 3, a top view of the key-board and connections; Fig. 4, a front view of the same, and Fig. 5 a diagram view of the various apparatus and their connections as employed in my key-board system.

Similar letters of reference indicate like parts in all the figures.

In the drawings, A represents a frame arranged with shelves, upon which are placed the different devices employed in my improved telephonic system.

B are indicators, of any suitable construction, attached to one of the shelves of the frame A.

C are spring-jacks arranged upon a shelf, each jack being placed directly under an indicator, to which it is connected and numbered in a conspicuous manner to correspond with the subscriber's line connected thereto.

D is a broad shelf or table, shown as connected to the frame A in Figs. 1 and 2, but may be separate from it, if desired. Upon this shelf are arranged the various devices employed in my invention.

In the center, and to the front of the shelf D, is placed the key-board E, composed of two rows of keys, $k k'$, of any desired number. In the drawings four black keys and one white key are shown in each row. The black keys are designated respectively from the inner key, A, B, C, and D. A white key, $c c'$, is placed in the center of each row of black keys. The opposite rows of keys, $k k'$, are connected to each other, when in their normal condition, by means of their back contacts, $d d'$, and wires $e$. Under each row of keys $k k'$ are placed anvil-strips $f f'$, connected with each other as follows: A wire, $p'$, connects strip $f'$ with a four-point switch, S, and the switch can be connected with the strip $f$ through the wire *p* by either of the buttons 1, 2, 3, and 4. (See Fig. 5.) If through button 1, a transmitter, T, and telephone R are put into circuit; if through button 2, a telephone alone is put in; if through button 3, a magneto-generator is connected to the line, and by means of button 4 a reversing-key, K, and battery O are thereby put into the line. It will be seen that when either of the keys *k k'* are depressed they are connected through the anvil-strips *f f'* to the switch S. The anvils of the white keys *c c'* are connected by wires *r r'* to the anvil-strips *f f'* opposite to them, as shown in Figs. 3 and 5. The keys *c c'* are each connected to ground, and these keys I call "ground-keys." The keys *k k'* are connected to flexible cords *g g'*, which pass down through the table or shelf D and then upward through the table, and have secured to their ends insulating-wedges *h*, which rest upon the table, as shown in Figs. 3 and 5.

Near to each wedge *h* upon the table are designating-letters A, B, C, and D, to correspond with the keys to which said wedges are connected by said flexible cords, as shown in Figs. 3 and 5.

In the bight or loop of the cords *g*, under the table, are hung pulley-weights *i i'*, each composed of a pulley having a grooved periphery to receive the cord, and a weight hung from the axis of said pulley. The object of these pulley-weights is to keep the cords *g* from becoming tangled with one another, and to keep the wedges *h*, when not in use, always at their respective holes in the table, ready for use. The lines from the different circuits on entering the central office are each connected to the springs *c²* of the spring-jacks C, numbered to correspond with its circuit. The shoe *d* of each jack is connected through indicators B to the ground.

The operation is as follows: The operator seeing, we will suppose, indicator 1 full, inserts any of the left-hand wedges, A, B, C, or D, (suppose D,) into the spring-jack under said indicator, with its metal side uppermost, thus removing the ground-connection and connecting line 1 with the key-board E. The operator, then switching his receiver and transmitter into line by turning switch S onto button 1, depresses the left-hand key D and the ground-key *c*, (thus making a circuit from line 1 through the key-board E to ground,) ascertains with whom the subscriber wishes to be connected, when he releases said keys and proceeds to call up the desired party, whom we will suppose to be on line 8. The operator now takes the right-hand, D, wedge, and inserts it into spring-jack No. 8, and, placing switch S upon button 4, cuts out the receiver and transmitter and puts in the reversing-key K, call-bell N, and battery O. He then taps said reversing-key to call up line 8, at the same time depressing the right-hand key, D, and its ground-key *c'*, thus making circuit from ground through key *c'*, anvil-bar *f*, bell N, reversing-key K, battery O, button 4, switch S, anvil-bar *f'*, wedge *h*, to station 8. This being usually sufficient to call up the desired subscriber, the operator releases the D and ground keys, and then turns his switch to button 2, and by depressing the two D-keys places his receiving telephone between the two lines, listens a moment to hear that they get started all right, then releases the keys, leaving the two parties talking with each other, and is ready to answer another call, using of course another pair of keys and wedges. The operator can ascertain when they have finished talking by pressing down the keys A A. If he finds they are done, he pulls out the wedges *h h'* from jacks 1 and 8, and is ready to answer any other call by the same keys and wedges. When the wedges are withdrawn from the jacks they are drawn to their places on the table by means of the pulley-weights *i* under the table D.

The simplicity of the apparatus will commend itself for central-office purposes, it being very desirable that the motions should be few and the apparatus of such a nature that it will be easily understood and operated. The apparatus has also the feature of directness of operation, a simple pressure of the finger making and breaking the desired connections in the most positive manner.

An important point in my invention is that all of the manipulations are performed by one operator. All of the apparatus being directly in front of him, conveniently arranged for operation, the business is conducted easily, simply, and rapidly, without the noise and confusion observed in some central-office systems.

When it is desired to connect more circuits, another frame A with apparatus can be placed beside the first.

When a switch-board with metal strips is used in connection with the key-board E, I employ in connection therewith indicators, spring-jacks, and flexible cords, with wedges, (as described in an application for a patent filed April 8, 1880,) and permanently connect the No. 1 metal strip thereof to the left-hand A-key, and No. 2 strip with the right hand A-key, and No 3 strip with the right B-key, and No. 4 strip with the left B-key, &c., so that when a communication is made between two subscribers upon strips 1 and 2 by means of flexible cords and wedges the circuit will be from subscriber 1 to metal strip 1, left-hand A-key to right-hand A-key, metal strip 2 to subscriber 2. In this case I prefer to place the key-board on a table separate from the frame A.

Having now fully described my said invention and the manner of carrying the same into effect, I would observe in conclusion that I do not claim herein the combination of the flexible cords and spring-plugs, of means for taking up the slack in said cords, nor do I claim the special means described for that purpose—viz., the movable weights suspended in the bight of the cords, the same being reserved for a separate application; but

What I do claim, and desire to secure by Letters Patent, is—

1. The combination, with a switch-board, of an independent key-board with spring-keys for manipulating circuits, and devices for temporarily connecting lines centering in said switch-board with the key-board, substantially as described.

2. A key-board having circuit-keys for connecting electrical conductors in circuit with each other through their bridges or back contacts, and ground-keys connected with the anvils of said circuit-keys for grounding the same, substantially as described.

3. In an electric key-board, the combination of circuit-keys with their bridges or back contacts electrically connected in pairs, and ground-keys connected with the anvils of the circuit-keys for grounding the same, substantially as described.

4. The combination, with two or more pairs of circuit-keys, of a pair of ground-keys connected with the anvils of each pair of circuit-keys for grounding said anvils separately or together, substantially as described.

5. The combination, with circuit-keys for connecting electrical conductors or circuits with each other through their bridges or back contacts, of a local-instrument circuit connected with the anvils of said circuit-keys, substantially as described.

6. The combination of circuit-keys for connecting electrical conductors or circuits with each other through their bridges or back contacts, of a local-instrument circuit connected with the anvils of said circuit-keys, and ground-keys connected with said anvils for grounding the same, substantially as described.

7. The combination, with line-circuits emanating from a central office, of a series of spring-keys and a telephone circuit or branch connected with the anvils of the circuit-keys and thus adapted to be brought into connection with the several lines by means of said keys, substantially as described.

8. A pair of circuit-keys having their back contacts connected with each other, combined with means for temporarily connecting said keys with line-circuits, substantially as described.

9. A pair of circuit-keys having their back contacts connected with each other, in combination with keys normally grounded having their anvils connected with those of the first-named keys, substantially as described.

10. The combination, with circuit-keys, of a local circuit provided with branches and connected with the anvils of said keys, and a switch for closing the local circuit through the required branch, substantially as described.

11. The combination of ground and circuit keys, local circuit provided with branches and connected with the anvils of said keys, and a switch for connecting in the required branch, substantially as described.

12. The combination, with a series of line-circuits emanating from a central office and a key-board, of a magneto-generator and battery located in separate branches, a switch, and electrical connections, substantially as described, whereby either of said sources of electricity can be connected temporarily with any of said lines through the key-board, as set forth.

THOMAS A. WATSON.

Witnesses:
CHARLES T. LORING,
WM. B. BACON, Jr.